VARIABLE FIXED PRECISION VALUE INDUCTOR

Filed July 8, 1968 2 Sheets-Sheet 1

INVENTOR/S

RAYMOND A. MORRIS

BY Melville, Strasser, Foster and Hoffman
ATTORNEYS

INVENTOR/S
RAYMOND A. MORRIS

BY Melville, Strasser, Foster and Hoffman
ATTORNEYS

United States Patent Office 3,496,503
Patented Feb. 17, 1970

3,496,503
VARIABLE FIXED PRECISION VALUE INDUCTOR
Raymond A. Morris, Indianapolis, Ind., assignor to Paul Smith, Inc., Cincinnati, Ohio, a corporation of Ohio
Filed July 8, 1968, Ser. No. 743,194
Int. Cl. H01f *15/02*; H02b *1/04*
U.S. Cl. 336—65 8 Claims

ABSTRACT OF THE DISCLOSURE

A variable fixed precision value inductor comprising an inductor coil, with leads projecting therefrom, and a pair of mounting feet. The mounting feet are characterized by a plurality of successive recessed portions, such that there are incremental changes in cross section throughout the height of said mounting feet. By this system, the inductor can be mounted on a printed circuit board at one of several fixed heights above the board, depending on the size of the mating recess in said board. This produces a single inductor that is capable of yielding several inductance levels.

BACKGROUND OF THE INVENTION

One of the standard broadcasting bands covers the frequencies of 88 to 108 MHz. Typically, in order to tune to resonance at a given frequency in this band, a variable capacitor was used to select resonance with a fixed inductance value. This was usually done with one control, resonating circuits in the antenna stage, the mixer or intermediate stages, and in the heterodyne oscillator circuit.

Problems developed with this tuning system as the accuracy was unsuitable. For example, an accuracy of $\pm 2\%$ in the values of L and $\Delta C$, the two variables in an otherwise fixed value circuit, is necessary to provide adequate tracking and agreement with dial calibration for the desired frequency band. In practice, the problems arise since each different tuner design will require slightly different values of lumped inductance to compensate for coupled and interconnection reactances inherent in the particular circuit and physical arrangement. And, without expensive tooling and high production costs, no commercial or practical means was available to produce a close tolerance inductor, thus, a single dial calibration was not possible.

However, by means of the present invention, it is now possible to produce a variable, yet fixed precision value inductor. That is, the inductor according to this invention will be capable of yielding a device having a number of predetermined values, or variations of precise discrete values of inductance from the same set of tooling in a production run. And, by the specific means to be described hereinafter, it is possible to select that value which is closest to the desired inductance value.

SUMMARY OF THE INVENTION

To accomplish the foregoing, there is provided a system based upon the principle of mating shape and recess. That is, an inductor device, among other elements, is provided with mounting feet having a stepped shape, the cross section of which changes by discrete values. By means of the feet, the inductor may be positioned at different heights above the mounting and connection surface, the latter generally being a printed circuit board, depending on mating recesses in said surface. The variation in distance between the connection surface and inductor body provides the inductance change by virtue of the inductance of the wire leads.

The key to securing the inductor on the mounting surface at one of several fixed heights is the mounting feet. The profile of a suitable mounting foot may take on the appearance of steps, facing outward or a set facing inward, or even pyramidal in shape. These and other shapes which may be derived by those skilled in the art upon reading these specifications, will become more apparent from the description to follow.

DETAILED DESCRIPTION

Figures 1, 2:
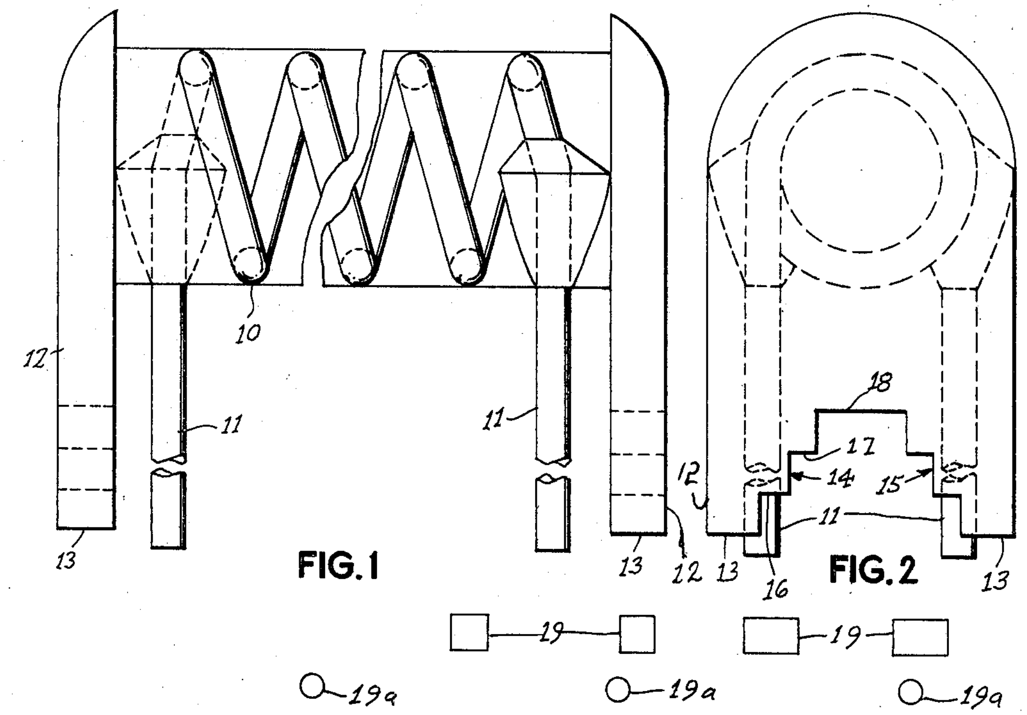
FIGURE 1 is a front view of an inductor made according to this invention.
FIGURE 2 is a side elevation of the inductor shown in FIGURE 1.

Turning now to a consideration of the details of this invention, it will be seen from FIGURES 1 and 2, the first of three disclosed embodiments, that the inductor device includes a coil 10, leads 11 and mounting feet or legs 12. It will be understood by those skilled in the art that the former two elements constitutes the simplest physical form of an inductor, i.e., a helix with tangential leads and encapsulated in stable plastic. However, it should be apparent that the same effect can be achieved with either radial or parallel axial leads or combinations thereof. Nevertheless, and without any intent to impose unnecessary limitations on this invention, for convenience and ease of understanding, the description will be limited to the practicing of this invention on the disclosed inductor.

In view of the above, no attempt will be made to detail the function and construction of the inductor per se as these are well known in the art. However, it will be observed that the leads 11 extend beyond the base 13 of the mounting legs 12. The extra length of the leads assures ample contact with the lead holes in the mounting board, which is generally a printed circuit board. This latter feature will become more apparent hereinafter.

Mounting legs 12, 22 and 32, shown in FIGURES 1, 2, and 4–7, may be made from any suitable non-conductive material such as plastic. They may be secured to the coil in many ways such as cementing, or may be formed as a single unit about the coil. In any case, the mounting legs are such as to space the coil 10 at several predetermined levels above the circuit board. By mounting the inductor coil at various fixed levels above the circuit board, it is possible to change the inductance thereof. That is, by extending or shortening the wire leads, the inductance changes since it is linear with distance. A typical inductance value of .095 $\mu$h. will change 4% in 0.125 inch.

Returning to the embodiment of FIGURES 1 and 2, it will be seen that the inductance change is accomplished by the stepped portions 14 and 15. Here, the stepped portions are characterized by shoulders 16, 17, and 18, one of which will lie adjacent the surface of the mounting board. Ultimately, it will depend upon the inductance value desired for the selection of the shoulder to be utilized.

Figure 3:
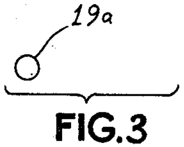
FIGURES 3 to 3*c* represent four alternative hole or recess patterns on a circuit board, for receiving the inductor shown in FIGURES 1 and 2, the plane of the drawing representing the surface of said circuit board.
Figure 3A:
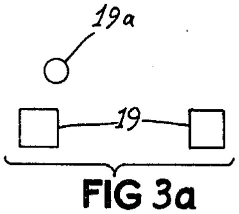
Figure 3B:
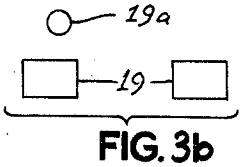
Figure 3C:
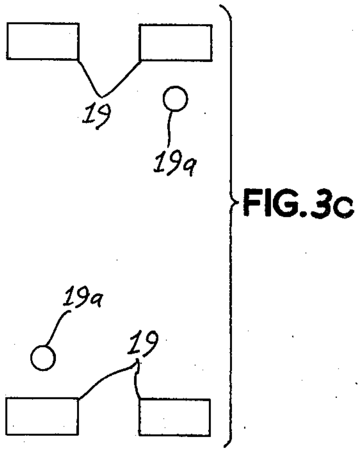

FIGURES 3 to 3*c* represent the alternative selections for the hole 19 or recess patterns to receiving the inductor of FIGURES 1 and 2. In practice, this inductor will be furnished with a rated inductance at four discrete values. After selecting the inductance value desired, the assembler need only to provide the appropriate hole or recesses in the circuit board.

For a specific example, assume the inductor of FIGURES 1 and 2, having an inductance rating of .093, .095, .097 and .099, μh. If a value of .097 μh. is adequate, a hole pattern similar to that shown in FIGURE 3*b* is made in the circuit board at the location for the inductor. The final operation is soldering the leads extending through hole 19*a* to the circuit board. The inductor will then appear to be resting with its shoulder 17 on the surface of the circuit board.

It is now possible to calibrate a tuner circuit containing said selected inductor to resonance in the manner to be described. Normally, to tune to resonance at the frequency within the prescribed frequency range, in the case of an FM tuner —88 to 108 MHz., a variable capacitor is usually used to select resonance with a fixed inductance value. However, the capacitance value C of the tuning condenser is not determinant in the coverage of the band of frequencies, only the change in capacitance (ΔC). And, the inductance value L of the fixed inductor is determined by ΔC. Thus, the conditions for resonance at the frequency band limits, where $F_1$ and $F_2$ are said limits, are as follows:

$$2\pi F_1 L = \frac{1}{2}\pi F_1 C$$
$$2\pi F_2 L = \frac{1}{2}\pi F_2 (C - \Delta C)$$

By solving for C, and eliminating same, the value of L may be determined, i.e., $$L = \frac{F_2^2 - F_1^2}{4\pi^2 F_2^2 F_1^2 \Delta C}$$

An accuracy of ±2% in the values of L and ΔC is usually sufficient to provide adequate tracking and agreement with dial calibration for the desired frequency band.

Figure 4:
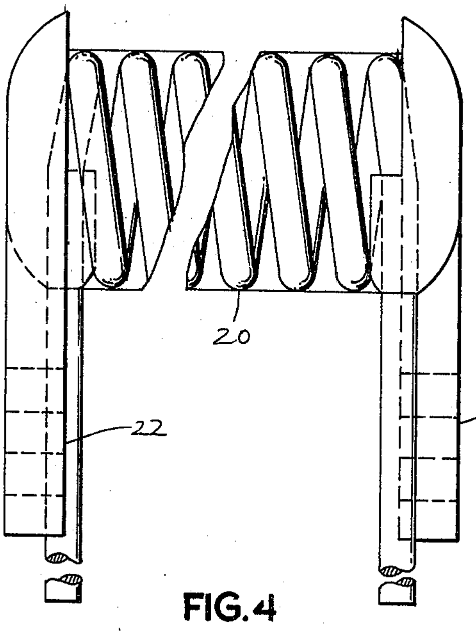
FIGURE 4 is a front view similar to FIGURE 1, but showing a second embodiment of this invention.
Figure 5:
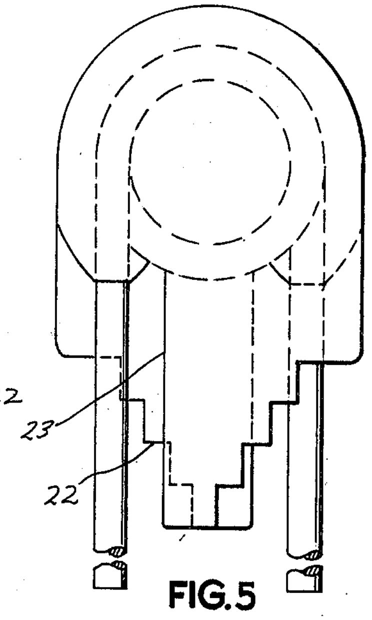
FIGURE 5 is a side elevation of the inductor shown in FIGURE 4.

A second embodiment of the inductor is shown in FIGURES 4 and 5. In this embodiment, the mounting legs 22 are characterized by a straight side 23 and a stepped side 24. Here it will be noted that there are five different levels at which the coil 20 can be mounted above the circuit board. It should therefore be obvious that a large or limited number of steps may be provided on the mounting feet. Thus, there is no desire to be restricted to any particular number such as disclosed herein. There is however, one common characteristic in all of the mounting feet used in this invention. The common feature is found in the presence of the change in cross section of the legs by discrete values. For instance, the first two embodiments (FIGURES 1, 2, 4 and 5) utilize mounting legs which are essentially rectangular in cross section. In moving from the top or coil portion of the leg to its base, it will be observed that each of the legs decrease by increments in cross section.

Figure 6:
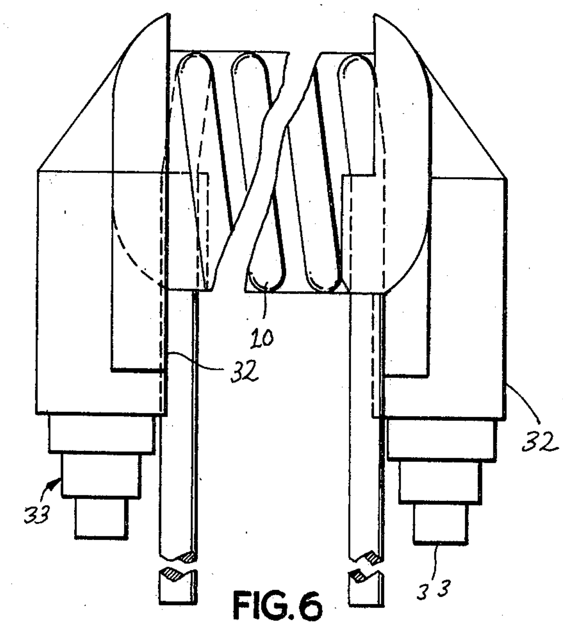
FIGURE 6 is a front view similar to FIGURES 1 and 4, but showing a third embodiment of this invention.
Figure 7:
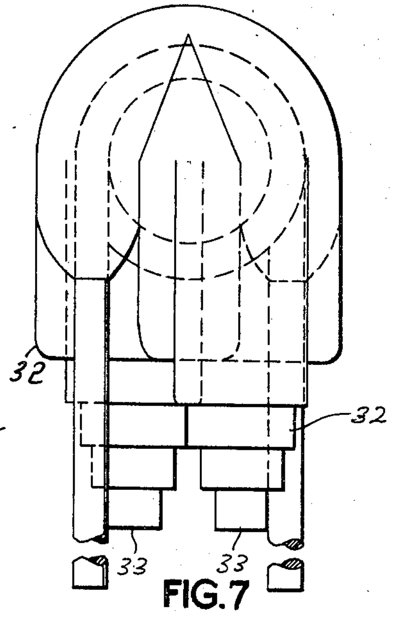
FIGURE 7 is a side elevation of the inductor shown in FIGURE 6.

A further and final embodiment of an inductor suitable for practicing this invention is illustrated in FIGURES 6 and 7. The mounting legs 32 for this inductor are broader which gives the device additional structural stability. The base 33 of the legs 32 may be characterized as a circular pyramid or a stack of circular disks centrally disposed one upon another in an orderly fashion. With legs of this type, it would be a simple matter to drill the necessary holes in the circuit board which would retain the inductor at the proper height above said board.

Since it will be apparent from this description that modifications may be made in the particular shape or size of the mounting legs, no limitation is intended to be imposed herein except as set forth in the appended claims.

The embodiments of the invention in which an exclusive property or privilege is claimed are defined as follows:

1. The combination of a circuit board and an inductor for mounting same a predetermined distance therefrom, comprising an inductor coil with leads projecting therefrom to be secured to said board, a pair of mounting feet extending parallel to said leads, each said foot composed of a descending order of different cross sections, whereby each said cross section is constant over a fixed length of said foot, and said circuit board provided with recesses of a size substantially equal to one of said cross sections to receive said feet and mount said inductor a predetermined distance from said board.

2. The combination claimed in claim 1 wherein the cross sectional change in the mounting feet is achieved by a stepped configuration in said feet.

3. The combination claimed in claim 2 wherein a first end of said mounting feet is characterized by at least one straight side and at least one step configured side.

4. The combination claimed in claim 2 wherein a first end of said mounting feet is characterized as a plurality of circular discs centrally disposed one upon the other in an orderly fashion.

5. In an electrical component having a coil with leads projecting therefrom, the improvement comprising in combination therewith, a pair of mounting feet extending parallel to said leads, and each said foot composed of a descending order of different cross sections, whereby each said cross section is constant over a fixed length of said foot.

6. The electrical component of claim 5 wherein the cross sectional change in the mounting feet is achieved by a stepped configuration in said feet.

7. The electrical component of claim 6 wherein a first end of said mounting feet is characterized by at least one straight side and at least one step configured side.

8. Electrical component of claim 6 wherein a first end of said mounting feet is characterized as a plurality of circular discs centrally disposed one upon the other in an orderly fashion.

References Cited

UNITED STATES PATENTS 2,773,159 12/1956 Taggant.
3,281,744 10/1966 Melanson ------------ 336—65

FOREIGN PATENTS 242,253 1/1963 Australia.

THOMAS K. KOZMA, Primary Examiner

U.S. Cl. X.R.

317—101